(12) United States Patent
Dwyer et al.

(10) Patent No.: US 12,221,147 B1
(45) Date of Patent: Feb. 11, 2025

(54) CAP SYSTEM FOR PALLET JACK

(71) Applicant: Amazon Technologies, Inc., Seattle, WA (US)

(72) Inventors: James Patrick Dwyer, King, WA (US); Eli Douglas Girod, Seattle, WA (US); Ryan Gratias, Issaquah, WA (US); Nathanael Edmund Deffenbaugh, Seattle, WA (US); Robert Matthew Gruendel, Sammamish, WA (US); Ed Gallagher, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 509 days.

(21) Appl. No.: 17/543,112

(22) Filed: Dec. 6, 2021

(51) Int. Cl.
*B62B 3/06* (2006.01)
*B66F 9/065* (2006.01)
*B66F 9/075* (2006.01)

(52) U.S. Cl.
CPC .......... *B62B 3/0625* (2013.01); *B62B 3/0618* (2013.01); *B66F 9/065* (2013.01); *B66F 9/07559* (2013.01)

(58) Field of Classification Search
CPC ............ B62B 2203/20; B62B 2203/24; B62B 3/0618; B62B 3/0612; B62B 2207/04; B62B 3/02; B62B 2203/74; B62B 2205/006; B62B 2205/30; B62B 2206/04; B62B 2207/00; B62B 2301/08; B62B 2301/23; B62B 3/001; B62B 3/0606; B62B 5/0033; B62B 5/0059; B62B 1/00; B62B 2203/10; B62B 2203/11; B62B 2203/26; B62B 2203/28; B62B 2203/29; B62B 2206/00; B62B 2206/02; B62B 3/0625; B66F 9/065; B66F 9/12; B66F 9/07559; B66F 9/07504; B66F 9/165; B66F 17/003; B66F 9/07586; B66F 9/19; B66F 5/04;
(Continued)

(56) References Cited

U.S. PATENT DOCUMENTS 4,287,959 A * 9/1981 Inman ...................... B60K 1/02
338/153
5,417,541 A * 5/1995 Herron ...................... B66F 9/06
414/346
(Continued)

*Primary Examiner* — James A Shriver, II
*Assistant Examiner* — Hilary L Johns
(74) *Attorney, Agent, or Firm* — Eversheds Sutherland (US) LLP

(57) ABSTRACT

In one example, a pallet jack cap system includes a stabilization outrigger secured around steer wheels of a pallet jack, a bonnet in an elevated position over forks of the pallet jack, an anchor base for attachment to the pallet jack, and a vertical extension system between the anchor base and the bonnet. The vertical extension system supports the bonnet in the elevated position over the forks of the pallet jack. The vertical extension system can include an elevating vertical support assembly, an elastic counterpoise to assist with positioning the bonnet at a particular elevation based on an extension of the vertical support assembly, and an extension lock to secure the vertical support assembly at the particular elevation. The bonnet can be lowered down over a unit load on a pallet transported by the pallet jack, to secure the unit load and items in transport by the pallet jack.

20 Claims, 12 Drawing Sheets

(58) Field of Classification Search
CPC .... B66F 9/06; B66F 9/07563; B66F 9/07572; B66F 9/122; B66F 9/14; B66F 9/142; B66F 9/18
USPC ..................................................... 280/43.12
See application file for complete search history.

(56) References Cited

U.S. PATENT DOCUMENTS

| | | | | |
|---|---|---|---|---|
| 6,042,329 | A * | 3/2000 | Marquez | B62B 3/0612 414/785 |
| 7,438,510 | B1 * | 10/2008 | Ledford | B60P 7/0807 410/97 |
| 7,641,011 | B2 * | 1/2010 | Fridlington, Jr. | B62B 3/0618 180/68.5 |
| 7,744,335 | B1 * | 6/2010 | Cleary | B66F 9/065 254/10 R |
| 7,976,032 | B1 * | 7/2011 | Dockins | B62B 3/0618 187/229 |
| 8,979,099 | B1 * | 3/2015 | Ellis | B66F 9/142 280/43.12 |
| 10,961,096 | B1 * | 3/2021 | Andersen | B66F 9/065 |
| 11,020,829 | B2 * | 6/2021 | Dolezel | B66F 5/04 |
| 11,952,247 | B1 * | 4/2024 | Dwyer | B60W 10/04 |
| 2003/0080544 | A1 * | 5/2003 | Rosenkranz | B25J 19/0083 280/762 |
| 2003/0190222 | A1 * | 10/2003 | Riggin | B62D 53/0864 414/540 |
| 2007/0284838 | A1 * | 12/2007 | Hartmann | B62B 3/008 280/43.12 |
| 2007/0292247 | A1 * | 12/2007 | Wilson | B62B 3/104 24/69 ST |
| 2011/0064558 | A1 * | 3/2011 | Johnson | B66F 9/18 414/800 |
| 2011/0233108 | A1 * | 9/2011 | Hutchinson, II | B65D 19/14 206/598 |
| 2012/0269606 | A1 * | 10/2012 | Newell | B62B 3/0612 414/495 |
| 2014/0291594 | A1 * | 10/2014 | Newell | B62B 5/0033 254/2 R |
| 2016/0075542 | A1 * | 3/2016 | Buchmann | B66F 17/003 414/667 |
| 2017/0240194 | A1 * | 8/2017 | Kalinowski | B62B 3/06 |
| 2017/0260001 | A1 * | 9/2017 | Burrow | B66F 9/19 |
| 2018/0370778 | A1 * | 12/2018 | Mathes | B66F 9/165 |
| 2019/0337782 | A1 * | 11/2019 | Vashchenko | B66F 9/07504 |
| 2020/0048059 | A1 * | 2/2020 | Werner | B66F 9/07559 |
| 2021/0031821 | A1 * | 2/2021 | Dusa, II | B66F 9/07559 |
| 2021/0032083 | A1 * | 2/2021 | Fink | B62B 3/06 |
| 2023/0202816 | A1 * | 6/2023 | Chandra | B62B 3/0612 180/65.1 |

\* cited by examiner

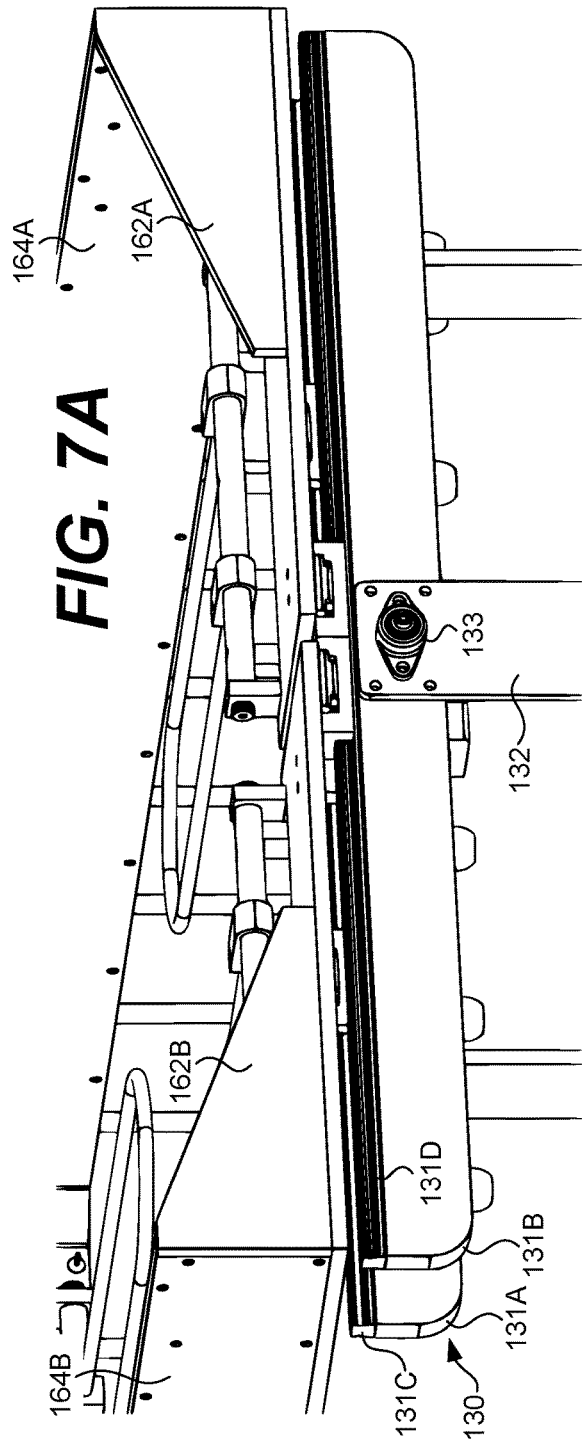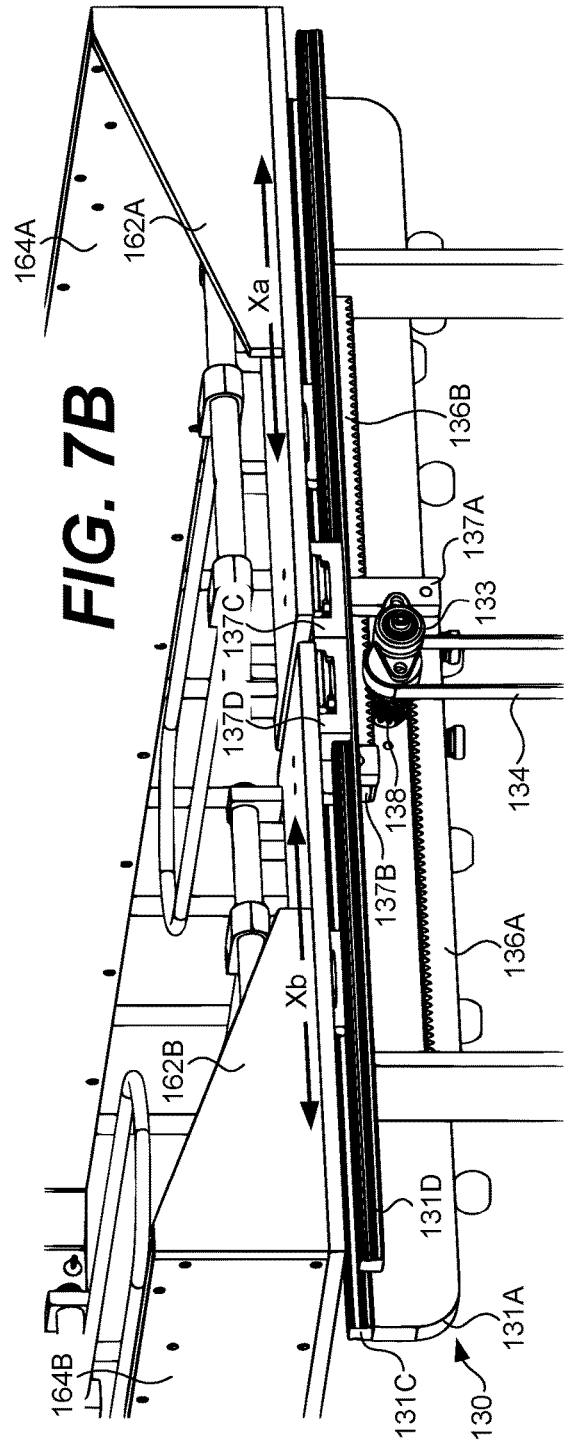

CAP SYSTEM FOR PALLET JACK

BACKGROUND

A pallet is a transport structure, often formed from wood or composite materials, that supports a unit load of goods or items that can be stacked over the pallet. With items supported on and over the pallet, the pallet can be lifted and moved by a forklift, front loader, pallet jack, or other machine. The pallet provides the structural foundation for the unit load, and it offers handling and storage efficiencies.

A manual pallet jack is a hand-operated tool or machine commonly used in warehouses to lift, reposition, and drop pallets of goods or items. A pallet jack can be steered using a handle that also acts as a pump lever for raising the forks of the pallet jack using a hydraulic pump, for example. A release mechanism on the handle of the pallet jack releases hydraulic fluid in the pump, permitting the forks to drop. Front wheels at ends of the forks are mounted on levers attached to linkages with the hydraulic pump. As the hydraulic pump is raised, the links force the front wheels down and the forks up, raising the forks vertically.

When a pallet jack is positioned with the forks of the pallet jack under a pallet, the forks can raise the pallet, with any unit load placed on it, until it clears the floor. The pallet jack and pallet can be repositioned in this raised position, relying on the wheels of the pallet jack. The pallet and unit load can then be dropped at another location, after repositioning. Pallet jacks can be used to move and organize pallets inside a trailer, warehouse, or other locations, and pallet jacks are often used in smaller or confined spaces where forklifts are not suitable.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

FIGS. 7A and 7B illustrate an example bonnet header of the pallet jack cap system shown in FIG. 3 according to various aspects of the embodiments.

DETAILED DESCRIPTION

As outlined above, pallet jacks are hand-operated tools or machines commonly used to lift, reposition, and drop pallets of goods or items. The unit load on a pallet can be irregular in some cases. For example, certain materials handling standards may define the size, shape, weight, or other characteristics of a unit load placed on a pallet (e.g., also a "pallet load") for purposes of load distribution, stability, stabilization, load deformation, safety, and other factors. One factor to consider for a unit load on a pallet is the height of the unit load. Boxes or other items that are stacked relatively high can be less stable and more likely to tip, deform and fall, or otherwise collapse, particularly when accelerated and decelerated and/or turned during moving operations.

Some pallet jacks are fitted with backwall supports or box-guards that extend up from around the A-frame of the pallet jack, shielding the operator of the pallet jack from boxes or items in a unit load that may fall backwards. However, these backwall supports are not commercially available in heights for tall unit loads, and they are insufficient to protect operators from items falling backwards from taller unit loads. Additionally, the commercially-available backwall supports do not help to maintain the integrity of a unit load, either when stationary or being transported.

In the context outlined above, pallet jack cap systems are described herein. In one example, a pallet jack cap system includes a stabilization outrigger secured around steer wheels of a pallet jack, a bonnet in an elevated position over the forks of the pallet jack, an anchor base for attachment to the pallet jack, and a vertical extension system between the anchor base and the bonnet. The vertical extension system supports the bonnet in the elevated position over the forks of the pallet jack. The vertical extension system can include an elevating vertical support assembly, an elastic counterpoise to assist with positioning the bonnet at a particular elevation based on an extension of the vertical support assembly, and an extension lock to secure the vertical support assembly at the particular elevation. The bonnet can be lowered down over a unit load on a pallet transported by the pallet jack, to secure the unit load and items in transport by the pallet jack.

Figure 1:
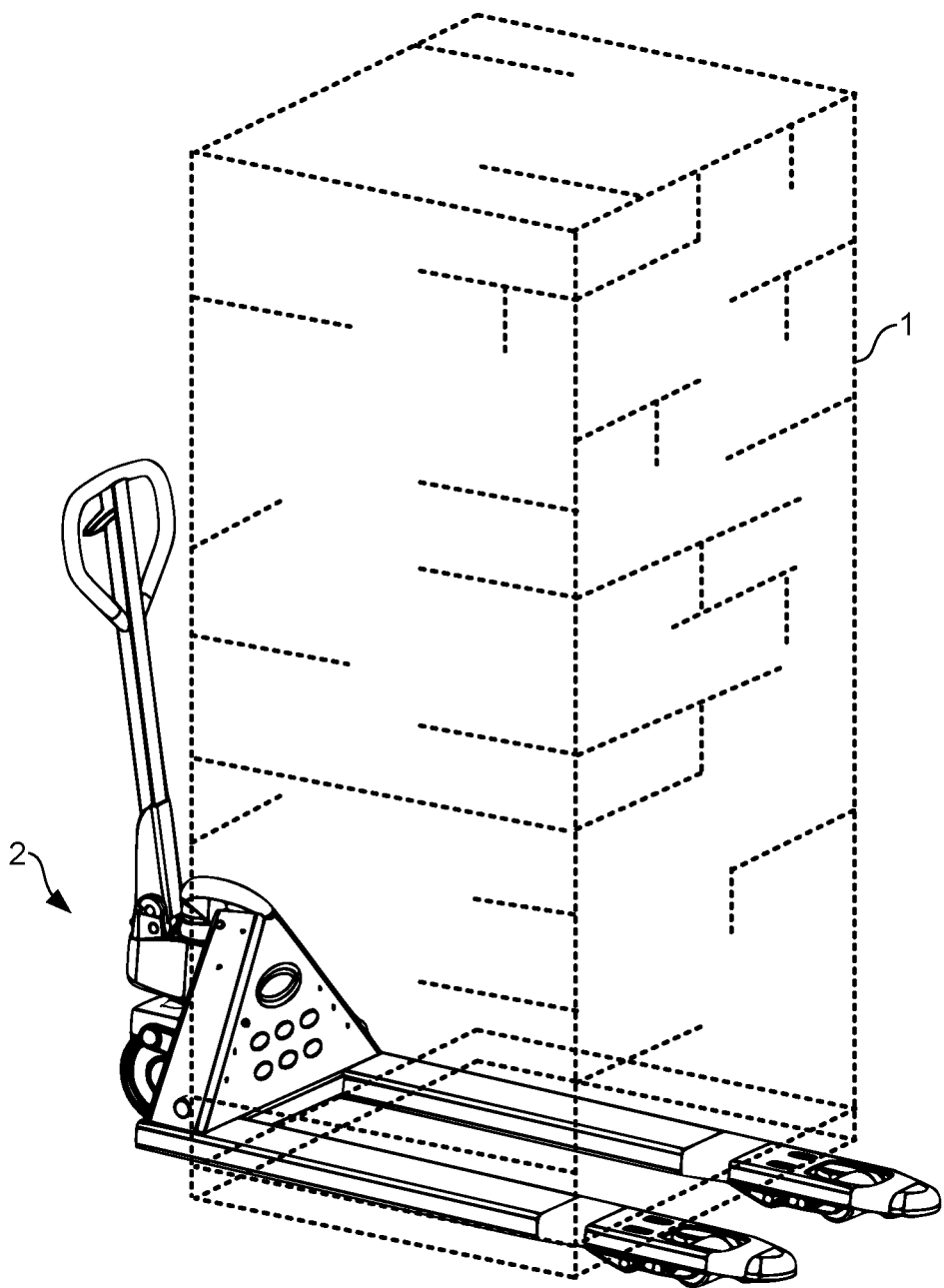
FIG. 1 illustrates an example unit load on a pallet jack according to various aspects of the embodiments.

Turning to the drawings for additional context, FIG. 1 illustrates an example unit load 1 on a pallet jack 2. The unit load 1 is irregular because it is relatively tall, such as taller than an acceptable standard height. The unit load 1 can also be unstable, prone to tipping, have certain items prone to tipping or sliding off, or have other stability issues. Boxes or other items that are stacked relatively high in the unit load 1 can be less stable and more likely to fall, particularly when accelerated and decelerated during moving operations. For items stacked as shown in the unit load 1, it would be helpful to have a way to secure the items, from the top of the unit load 1.

Figure 2A:
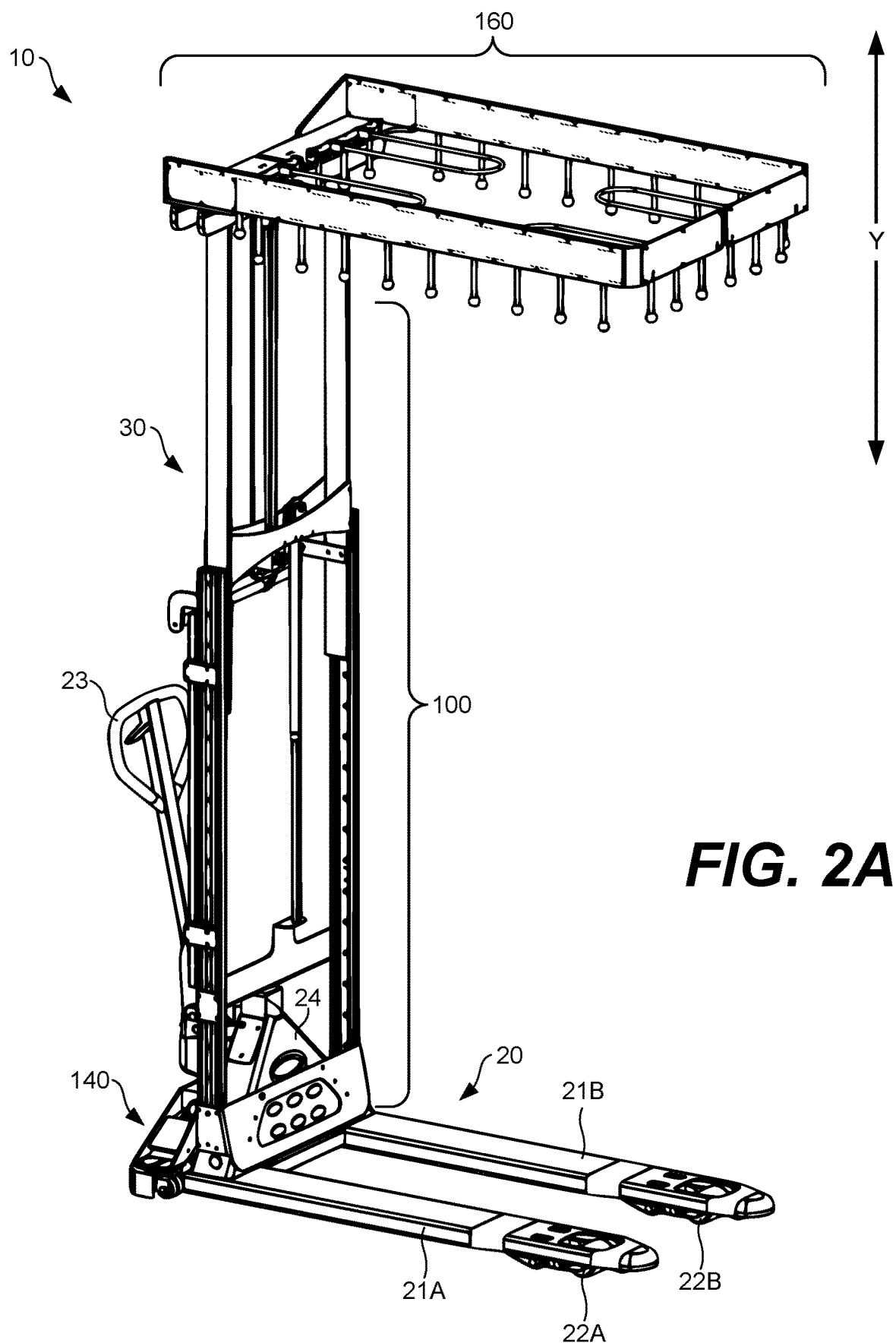
FIG. 2A illustrates an example materials transport system according to various aspects of the embodiments.

FIG. 2A illustrates an example materials transport system 10 according to various aspects of the embodiments. The system 10 includes a pallet jack 20 and a pallet jack cap system 30 secured to the pallet jack 20. Among other components, the pallet jack 20 includes forks 21A and 21B with load wheels 22A and 22B, a steering handle 23, steer wheels (not shown in FIG. 2A), and an A-frame 24.

As described in further detail below with reference to FIG. 3, the pallet jack cap system 30 includes a vertical extension system 100 (also "extension system 100"), a stabilization outrigger 140, and a perimeter bonnet 160. The stabilization outrigger 140 is secured around the steer wheels of the pallet jack 20. The stabilization outrigger 140 provides additional stability to the pallet jack 20, to help prevent the pallet jack 20 from tipping or turning over, particularly due to the additional weight and leverage provided by the perimeter bonnet 160.

One end of the extension system 100 is secured to the A-frame 24 of the pallet jack 20. The perimeter bonnet 160 is secured in a cantilevered arrangement at another end of the extension system 100, where it is maintained in an elevated position over the forks 21A and 21B of the pallet jack 20. The perimeter bonnet 160 can also be repositioned in the "Y" direction, as shown in FIG. 2A (i.e., up or down, top to bottom of the page as shown), based on an extension or a retraction of the extension system 100, which is described in further detail below.

Figure 2B:
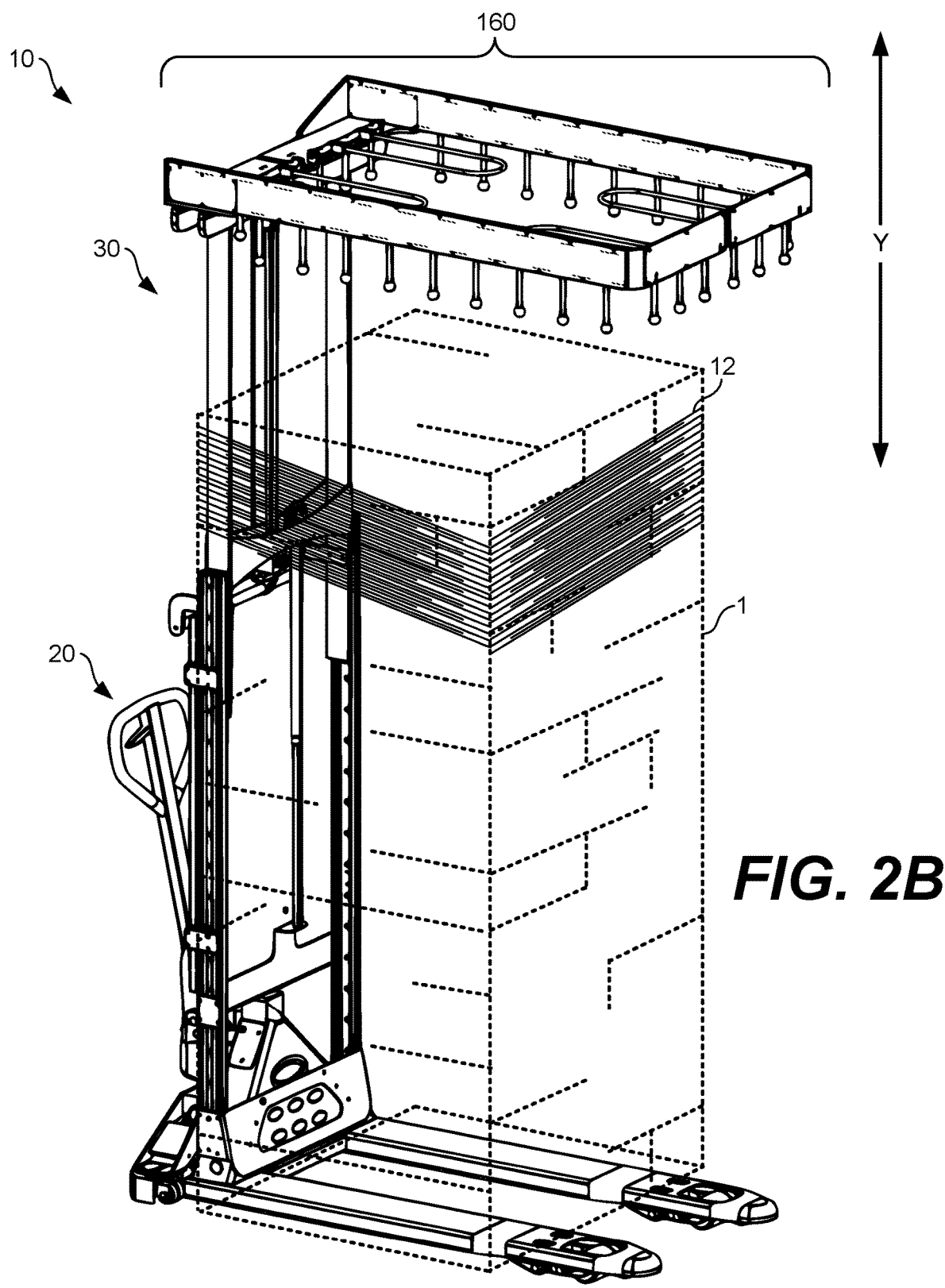
FIG. 2B illustrates the example materials transport system shown in FIG. 2A, with a unit load on a pallet, according to various aspects of the embodiments.

FIG. 2B illustrates the example materials transport system 10 shown in FIG. 2A, with the unit load 1 on a pallet, according to various aspects of the embodiments. As noted above, the unit load 1 is irregular because it is relatively tall. The unit load 1 can also be unstable, prone to tipping, have certain items prone to tipping or sliding off, or have other stability issues. Boxes or other items that are stacked relatively high in the unit load 1 can be less stable and more likely to fall, particularly when accelerated and decelerated during moving operations.

To help secure the unit load 1, the pallet jack cap system 30 can be adjusted to lower the perimeter bonnet 160 down onto, over, and around the top of the unit load 1, helping to hold it in place while it is repositioned using the pallet jack 20. The perimeter bonnet 160 of the pallet jack cap system 30 includes a number of features that help to not only secure the unit load 1, but to also facilitate unloading the unit load 1, at least in part, with the perimeter bonnet 160 in a lowered position. For example, as described in further detail below, the perimeter bonnet 160 includes a number of catch fingers with roller-ball caps. The perimeter bonnet 160 is designed such that the catch fingers and roller-ball caps lightly clamp the items at the top of the unit load 1, as the perimeter bonnet 160 is lowered over the unit load 1. The roller-ball caps roll and facilitate the removal of wrapping 12, such as plastic wrapping, that may be used to secure the unit load 1 together, even when the perimeter bonnet 160 is in the lowered position over the unit load 1. The perimeter bonnet 160 can also be adjusted in width in some cases, as described in more detail below with reference to FIGS. 7A and 7B.

Figure 3:
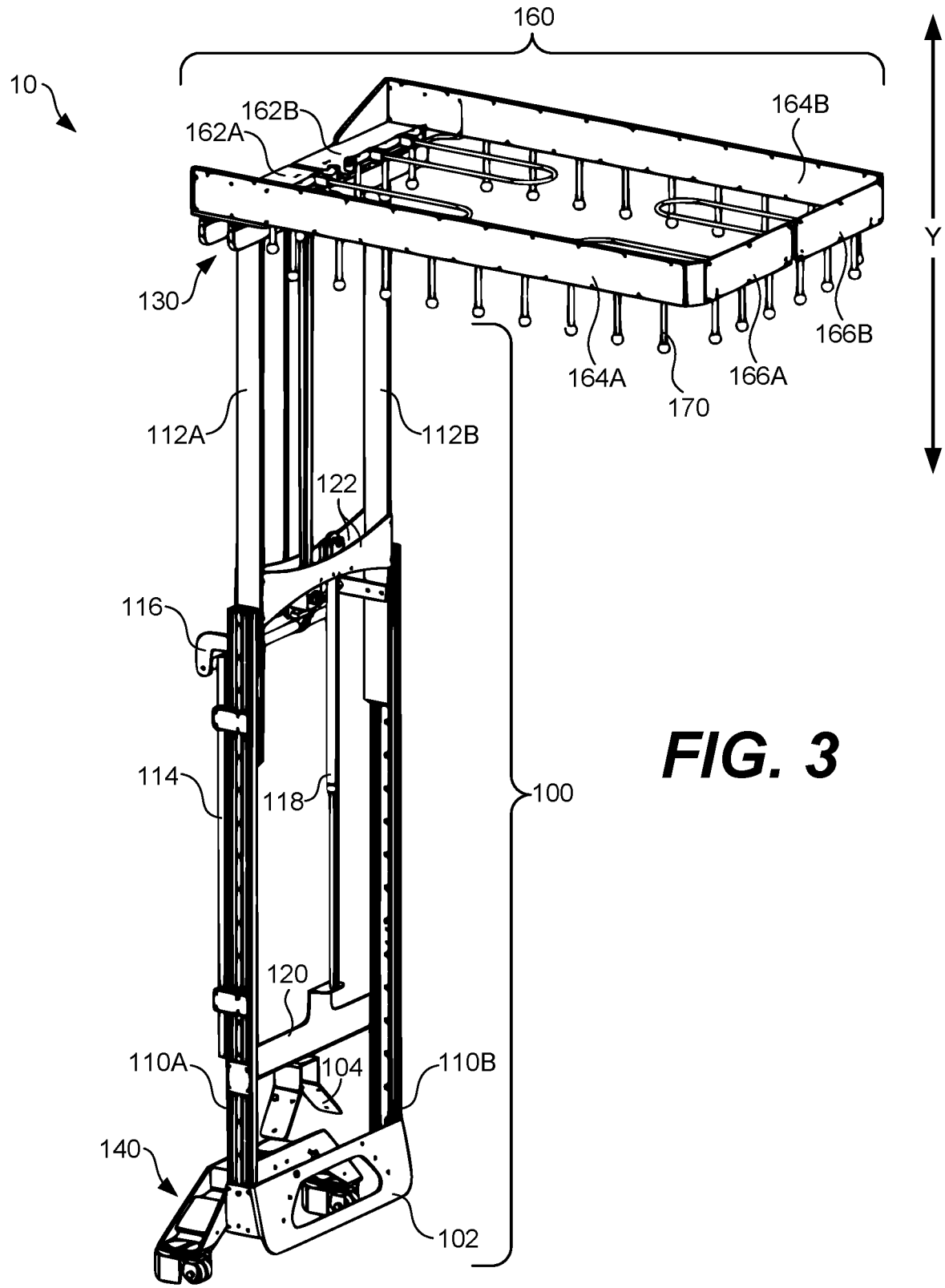
FIG. 3 illustrates an example pallet jack cap system according to various aspects of the embodiments.

FIG. 3 further illustrates the pallet jack cap system 30 according to various aspects of the embodiments. The pallet jack cap system 30 is illustrated as a representative example in FIG. 3, and the pallet jack cap system 30 is not drawn to any specific scale. One or more of the components shown in FIG. 3 can be omitted or replaced with other components in some examples. In other cases, the pallet jack cap system 30 can include additional parts or components that are not illustrated in FIG. 3. The pallet jack cap system 30 can be formed from any suitable material or materials, including steel, aluminum, other metals, wood, plastic, rubber, or other materials and combinations thereof having sufficient strength and desirable properties. The pallet jack cap system 30 is not limited to being formed from any particular materials among the embodiments.

Among other components discussed below, the extension system 100 includes an anchor base 102, an A-frame cap 104, an elevating vertical support assembly having outer rails 110A and 110B, inner rails 112A and 112B, a handle 116, a lower frame support 120, and upper frame supports 122, an extension lock 114, an elastic counterpoise 118 secured between the lower frame support 120 and the upper frame supports 122, and a bonnet header 130. The perimeter bonnet 160 is secured to the bonnet header 130 in a cantilevered arrangement, as shown in FIG. 3.

Figure 4:
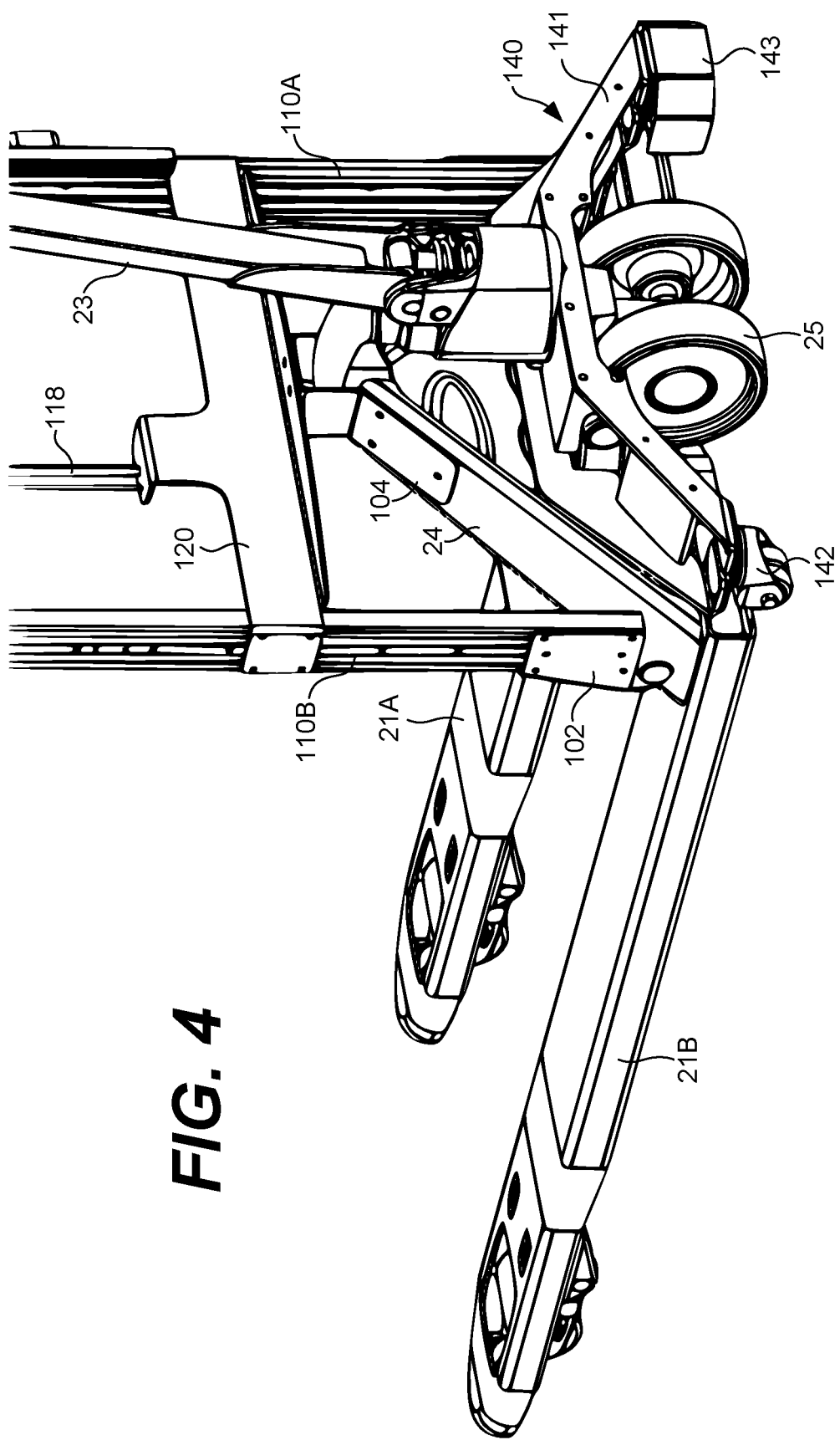
FIG. 4 illustrates an example anchor base and stabilization outrigger of the pallet jack cap system shown in FIG. 3 according to various aspects of the embodiments.

The anchor base 102 and the A-frame cap 104 are configured for attachment to the A-frame 24 of the pallet jack 20 (see FIGS. 2A and 4). Thus, the anchor base 102 and the A-frame cap 104 provide a secure base or platform to secure the extension system 100 on top of the pallet jack 20, with the extension system 100 extending vertically. The outer rails 110A and 110B are secured to the anchor base 102 using one or more bolts, mechanical interferences, welds, or other suitable means. The lower frame support 120 is also secured to the A-frame cap 104 using one or more bolts, mechanical interferences, welds, or other suitable means.

The elastic counterpoise 118 is arranged to assist with positioning the perimeter bonnet 160 to or at a particular elevation based on an extension of the extension system 100, in counterbalance against a weight of the perimeter bonnet 160. In one example, the elastic counterpoise 118 can be embodied as a gas spring. The elastic counterpoise 118 can use compressed gas contained within an enclosed cylinder, which is sealed by a sliding piston, to pneumatically store potential energy. The elastic counterpoise 118 can also release the potential energy to assist with repositioning the perimeter bonnet 160.

Particularly, the inner rails 112A and 112B can extend up or retract down with respect to the outer rails 110A and 110B of the extension system 100. During extension of the inner rails 112A and 112B up from between the outer rails 110A and 110B in the "Y" direction, the elastic counterpoise 118 can provide a force (i.e., applied between the lower frame support 120 and the upper frame supports 122) that assists with elevating the perimeter bonnet 160 with only the nominal addition of an upward force provided by an operator of the pallet jack cap system 30. During retraction of the inner rails 112A and 112B down between the outer rails 110A and 110B in the "Y" direction, the elastic counterpoise 118 can store potential energy, as the inner rails 112A and 112B slide down between the outer rails 110A and 110B, with only the nominal addition of a downward force provided by an operator of the pallet jack cap system 30. Once the perimeter bonnet 160 is extended or retracted to a desired position, the extension lock 114 can be relied upon to secure the extension system 100 in place. The extension lock 114 is described in further detail below with reference to FIGS. 6A and 6B.

In some cases, the elastic counterpoise 118 can exert forces, at least in part, by way of one or more cables, pulleys, and related mechanical means to obtain a mechanical advantage or disadvantage. The cables, pulleys, and related means can be secured to one or more of the lower frame support 120, the upper frame supports 122, and other locations on the extension system 100, along with the elastic counterpoise 118, to provide the mechanical advantage or disadvantage.

The perimeter bonnet 160 includes a perimeter frame. The perimeter frame includes a cantilevered frame base 162A and 162B, frame extension arms 164A and 164B, and a frame end closure 166A and 166B. The frame of the perimeter bonnet 160 can be formed from any suitable materials, including steel, aluminum, other metals, wood, plastic, rubber, or other materials and combinations thereof having sufficient strength and desirable properties. As compared to the outer rails 110A and 110B and inner rails 112A and 112B, however, the materials used for the perimeter bonnet 160 may be selected with an emphasis on less weight.

The perimeter bonnet 160 also includes one or more pivoting frame catch assemblies, which are described in additional detail below with reference to FIG. 9. A number of catch fingers 170 extend from pivoting rods of the pivoting frame catch assemblies, and the catch fingers 170 are also described in additional detail below. The perimeter bonnet 160 can also be adjusted in width in some cases, as described in more detail below with reference to FIGS. 7A and 7B. As one example, when adjusted, the frame base 162A can be spread apart from the frame base 162B. Similarly, the frame extension arm 164A can be spread apart from the frame extension arm 164B, and the frame end closure 166A can be spread apart from the frame end closure 166B. In that way, the width of the perimeter bonnet 160 can be increased to accommodate a unit load 1 of greater size. The perimeter bonnet 160 can also be moved laterally in some cases, and other options are described below.

FIG. 4 illustrates the anchor base 102, the A-frame cap 104, and the stabilization outrigger 140 of the pallet jack cap system 30 shown in FIG. 3. As shown, both the anchor base 102 and the A-frame cap 104 are secured on the A-frame 24 of the pallet jack 20. The anchor base 102 and the A-frame cap 104 can be secured on the A-frame 24 using bolts, welds, mechanical interlocks or interferences, or other suitable means. The anchor base 102 and the A-frame cap 104 provide a secure base or platform to secure the extension system 100 on top of the pallet jack 20, with the extension system 100 extending vertically. The outer rails 110A and 110B are secured to the anchor base 102 using one or more bolts, mechanical interferences, welds, or other suitable means. The lower frame support 120 is also secured to the A-frame cap 104 using one or more bolts, mechanical interferences, welds, or other suitable means.

The stabilization outrigger 140 is secured around the steer wheels 25 of the pallet jack 20. The stabilization outrigger 140 provides additional stability to the pallet jack 20, to help prevent the pallet jack 20 from tipping or turning over, particularly due to the additional weight and leverage provided by the perimeter bonnet 160. The stabilization outrigger 140 includes a stabilization truss 141 which extends over the steer wheels 25 of the pallet jack 20 and is secured in that location to the pallet jack 20. The stabilization outrigger 140 also includes a stabilization wheel 142 secured at one end of the stabilization truss 141, and another stabilization wheel (not visible) is also secured at another end of the stabilization truss 141. The stabilization outrigger 140 also includes a shroud 143, and a similar shroud can be relied upon to cover the stabilization wheel 142, although it is not shown in FIG. 4. The shroud 143 protects the stabilization wheel behind it and prevents the stabilization wheel from contacting the feet or shoes of an operator of the pallet jack cap system 30.

Figure 5:
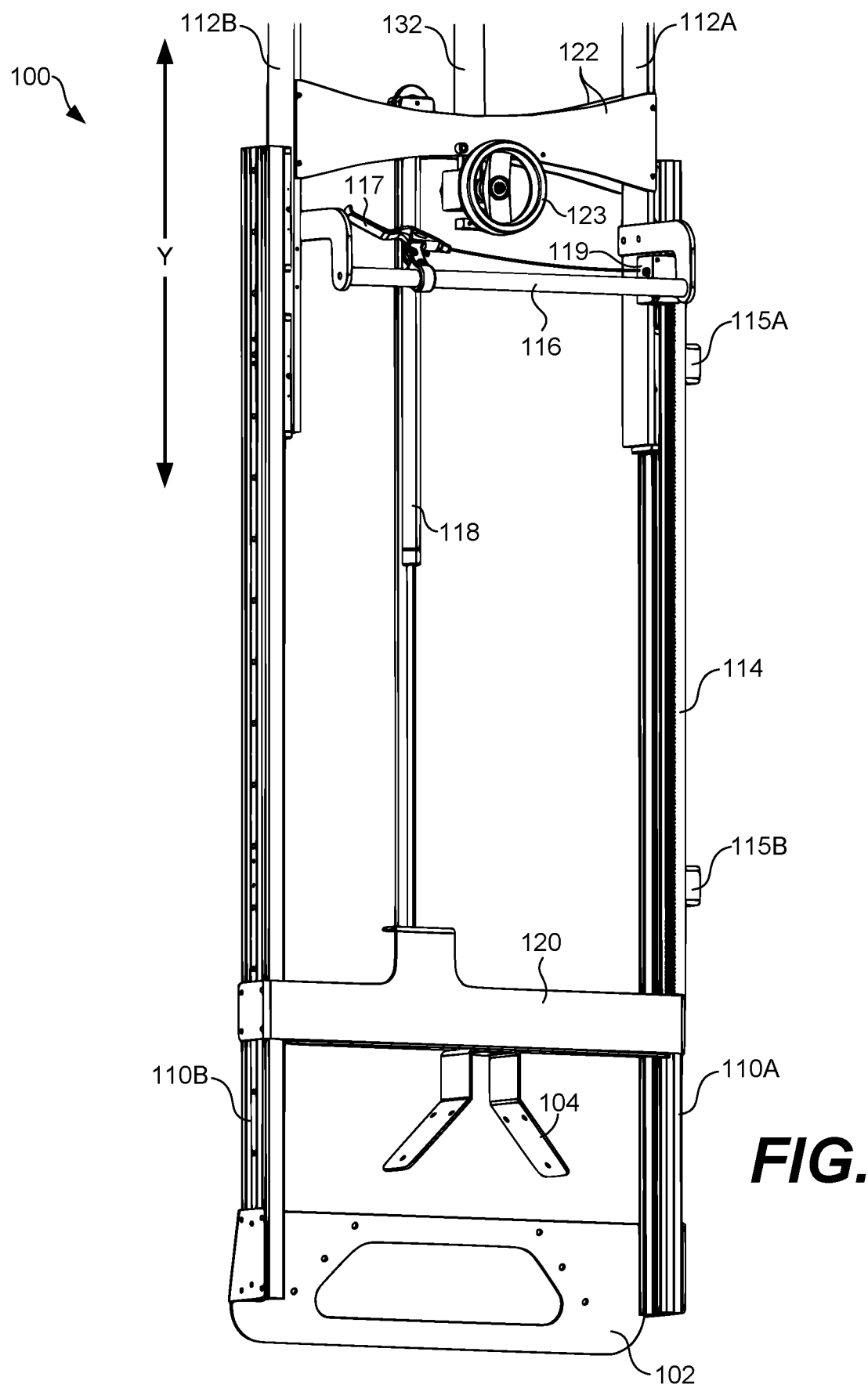
FIG. 5 illustrates an example vertical extension system of the pallet jack cap system shown in FIG. 3 according to various aspects of the embodiments.

FIG. 5 illustrates an example vertical extension system 100 of the pallet jack cap system 30 shown in FIG. 3 according to various aspects of the embodiments. In addition to the components described above, the vertical extension system 100 also includes a handle 116 and a brake lever 117 secured to the handle 116. The brake lever 117 can be used to actuate a brake 119 in connection with the extension lock 114. The extension lock 114 can be embodied by a rack gear, and the extension lock 114 is secured into position along the outer rails 110A by the brackets 115A and 115B.

The elastic counterpoise 118 is arranged to assist with positioning the perimeter bonnet 160 to or at a particular elevation based on an extension of the extension system 100, in counterbalance against a weight of the perimeter bonnet 160. The elastic counterpoise 118 can be embodied as a gas spring in one example, although other components can be relied upon, such as springs, bands, hydraulics, and other means. In the example shown, the elastic counterpoise 118 can use compressed gas contained within an enclosed cylinder, which is sealed by a sliding piston, to pneumatically store potential energy. The elastic counterpoise 118 can also release the potential energy to assist with repositioning the perimeter bonnet 160.

Particularly, the inner rails 112A and 112B can extend up or retract down with respect to the outer rails 110A and 110B of the extension system 100 when an operator squeezes or actuates the brake lever 117. When the brake lever 117 is actuated, a locking mechanism of the brake 119 is disengaged from the extension lock 114. Otherwise, when the brake lever 117 is not actuated, the brake 119 is spring biased to engage with the rack gear of the extension lock 114, securing the inner rails 112A and 112B with respect to the outer rails 110A and 110B.

When the brake lever 117 is actuated, the inner rails 112A and 112B can be extended up from between the outer rails 110A and 110B in the "Y" direction, as the inner rails 112A and 112B can slide between the outer rails 110A and 110B. The elastic counterpoise 118 can provide a force (i.e., applied between the lower frame support 120 and the upper frame supports 122) that assists with elevating the perimeter bonnet 160 with only the nominal addition of an upward force provided on the handle 116 by an operator when the brake lever 117 is actuated. The inner rails 112A and 112B can also be retracted down between the outer rails 110A and 110B in the "Y" direction when the brake lever 117 is actuated. The elastic counterpoise 118 can store potential energy, as the inner rails 112A and 112B slide down between the outer rails 110A and 110B, with only the nominal addition of a downward force provided on the handle 116 by an operator when the brake lever 117 is actuated. Once the perimeter bonnet 160 is extended or retracted (i.e., raised or lowered in the "Y" direction) to a desired position, the brake lever 117 can be released to lock the brake 119 in connection with the extension lock 114. The brake 119 and extension lock 114 are described in further detail below with reference to FIGS. 6A and 6B.

FIG. 5 also illustrates an example component in a bonnet adjustment mechanism, which is also described below with reference to FIG. 7B. Particularly, the wheel 123 is a component in the bonnet adjustment mechanism, and an operator of the extension system 100 can turn the wheel 123 clockwise or counter-clockwise to reposition or reconfigure the size or placement of the perimeter bonnet 160. A belt or other linkage is arranged behind the cover plate 132, to translate the movement of the wheel 123 up to a bonnet header 130, which is configured to reposition or reconfigure the size or placement of the perimeter bonnet 160. The bonnet adjustment mechanism is described in additional detail below with reference to FIG. 7B.

Figure 6A:
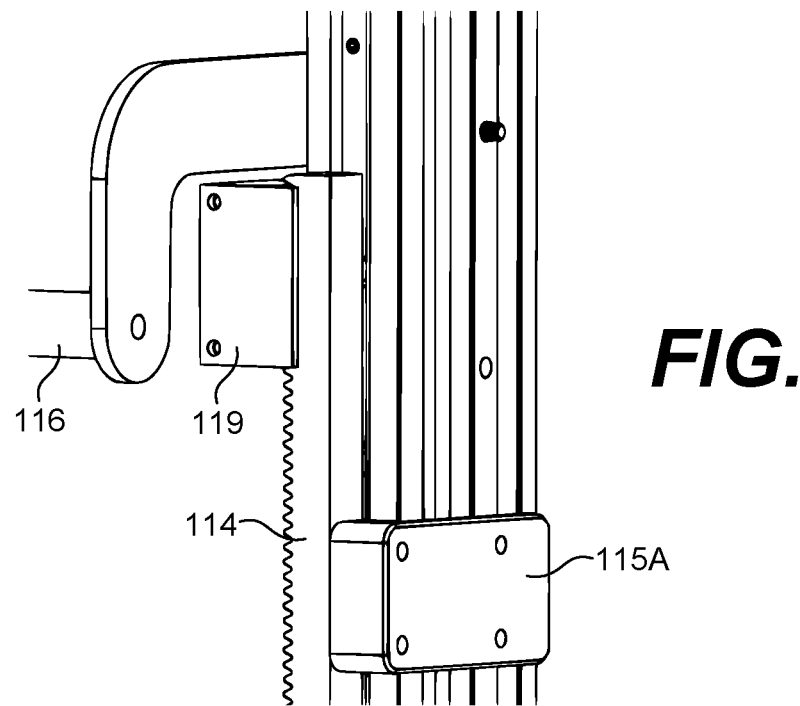
FIGS. 6A and 6B illustrate an example extension lock of the pallet jack cap system shown in FIG. 3 according to various aspects of the embodiments.
Figure 6B:
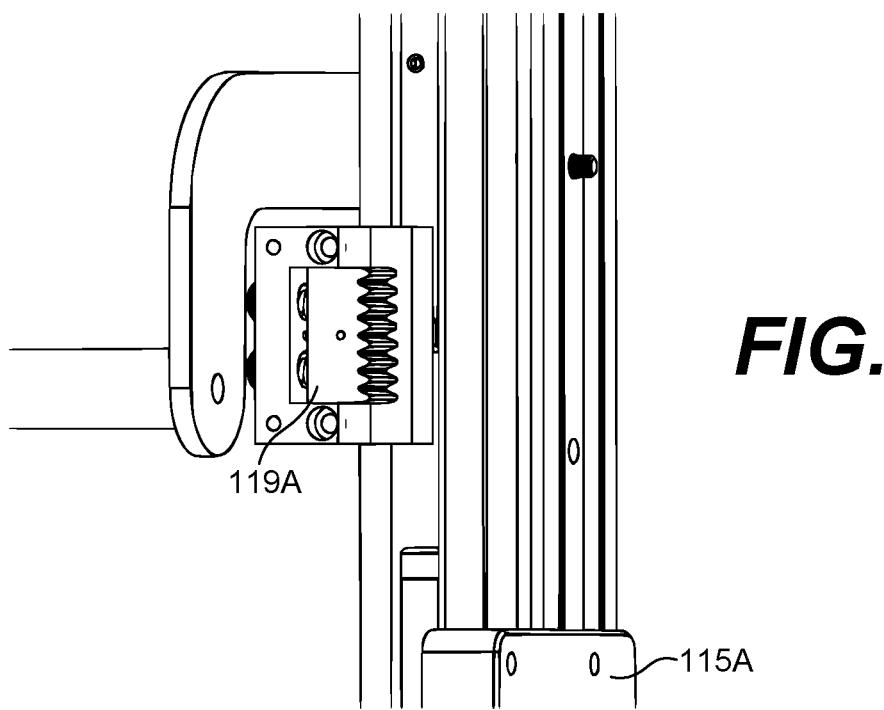

FIGS. 6A and 6B illustrate an example extension lock 114 and brake 119 of the pallet jack cap system 30 shown in FIG. 3 according to various aspects of the embodiments. In FIG. 6B, the extension lock 114 and a cover of the brake 119 are omitted from view, so that the brake key 119A is visible. In the example shown, the extension lock 114 is embodied as a rack gear, and the brake key 119A is embodied as a mating key with teeth, and the mating key mechanically couples to the teeth of the rack gear.

The brake key 119A is spring biased by one or more springs, within the brake 119, to mechanically engage and interfere with the extension lock. The spring bias can be overcome or counteracted by a mechanical interlink, such as a brake cable, that runs between the brake lever 117 and the brake 119. Thus, when the brake lever 117 is actuated, the brake key 119A is pulled away from and disengaged from the extension lock 114. This will release the inner rails 112A and 112B with respect to the outer rails 110A and 110B, and the inner rails 112A and 112B will be able to slide or move. When the brake lever 117 is not actuated, which is the steady state, the brake key 119A is spring biased to engage with the rack gear of the extension lock 114. This will secure the inner rails 112A and 112B with respect to the outer rails 110A and 110B, and the inner rails 112A and 112B will not be able to slide or move.

FIGS. 7A and 7B illustrate an example bonnet header 130 of the pallet jack cap system 30 shown in FIG. 3 according to various aspects of the embodiments. Among other components, the bonnet header 130 includes a first track brace 131A and a second track brace 131B. The second track brace 131B is omitted from view in FIG. 7B, so that the internal components of the bonnet header 130 can be shown. The bonnet header 130 also includes a first slide rail 131C supported on the first track brace 131A and a second slide rail 131D supported on the second track brace 131B. The bonnet header 130 also includes a cover plate 132, which extends and is secured between the second track brace 131B and the upper frame supports 122 (see also FIG. 5). The cover plate 132 is omitted from view in FIG. 7B, to show the adjustment belt 134.

Referring to FIG. 7B, the bonnet header 130 also includes a first rack gear 136A, a second rack gear 136B, and a pinion gear 138 in mechanical engagement with the rack gears 136A and 136B. The pinion gear 138 is centrally located between the rack gears 136A and 136B. A shaft (not visible) extends through the center of the pinion gear 138 and is pivotably secured between the track braces 131A and 131B, using bearings. For example, the shaft is pivotably secured to the second track brace 131B using the bearings 133. The adjustment belt 134 is also wrapped around a cylinder secured to the shaft, and movement of the adjustment belt 134 translates to rotation of the shaft and the pinion gear 138.

A first coupling 137A is securely fixed at one end of the first rack gear 136A, as shown in FIG. 7B, and extends up to a slide coupling 137C at a top of the bonnet header 130. Similarly, a second coupling 137B is securely fixed at one end of the second rack gear 136B and extends up to a slide coupling 137D at the top of the bonnet header 130. The slide couplings 137C and 137D are engaged with and can slide along the slide rails 131C and 131D.

In the example shown, the perimeter bonnet 160 is slidably secured to the bonnet header 130, in a cantilevered arrangement at the top end of the extension system 100. Particularly, the frame base 162A of the perimeter bonnet 160 is secured to the slide coupling 137C, which is engaged with and can slide along the slide rails 131C and 131D in the "X" direction. The frame base 162B of the perimeter bonnet 160 is also secured to the slide coupling 137D, which is also engaged with and can slide along the slide rails 131C and 131D in the "X" direction. The frame base 162A and the frame base 162B can also be secured to the slide rails 131C and 131D with additional couplings that also slide along the slide rails 131C and 131D.

An operator of the pallet jack cap system 30 can adjust the position of, or expand the size of, the perimeter bonnet 160 based on the structural configuration of the bonnet header 130. Particularly, at the top end of the extension system 100 shown in FIG. 7B, the adjustment belt 134 is wrapped around the shaft within the pinion gear 138. In the middle of the extension system 100, the adjustment belt 134 is also mechanically coupled to the wheel 123, as shown in FIG. 5. Thus, counter-clockwise rotation of the wheel 123 and the adjustment belt 134 results in counter-clockwise movement of the pinion gear 138. Similarly, clockwise rotation of the wheel 123 and the adjustment belt 134 results in clockwise movement of the pinion gear 138.

With rotation of the pinion gear 138, the pinion gear 138 pushes or pulls the rack gear 136B in the direction "Xb," and the pinion gear 138 pushes or pulls the rack gear 136A in the direction "Xa." Based on the mechanical arrangement of the bonnet header 130 described above and shown in FIGS. 7A and 7B, the movement of the rack gears 136A and 136B will translate into movement of the frame base 162A and the frame base 162B, in the directions "Xa" and "Xb," respectively. The frame base 162A and the frame base 162B can thus be repositioned along the slide rails 131C and 131D.

In the arrangement shown in FIGS. 7A and 7B, rotation of the pinion gear 138 results in an expansion or widening of the perimeter bonnet 160. However, other variations are within the scope of the embodiments. For example, the bonnet header 130 can include only a single rack gear similar to one of, although possibly longer than, the rack gears 136A and 136B, and the entire perimeter bonnet 160 can be mechanically coupled to that single rack gear. In this arrangement, the rotation of the pinion gear 138 can result in lateral movement of the entire perimeter bonnet 160, without expanding or widening it.

Figure 8:
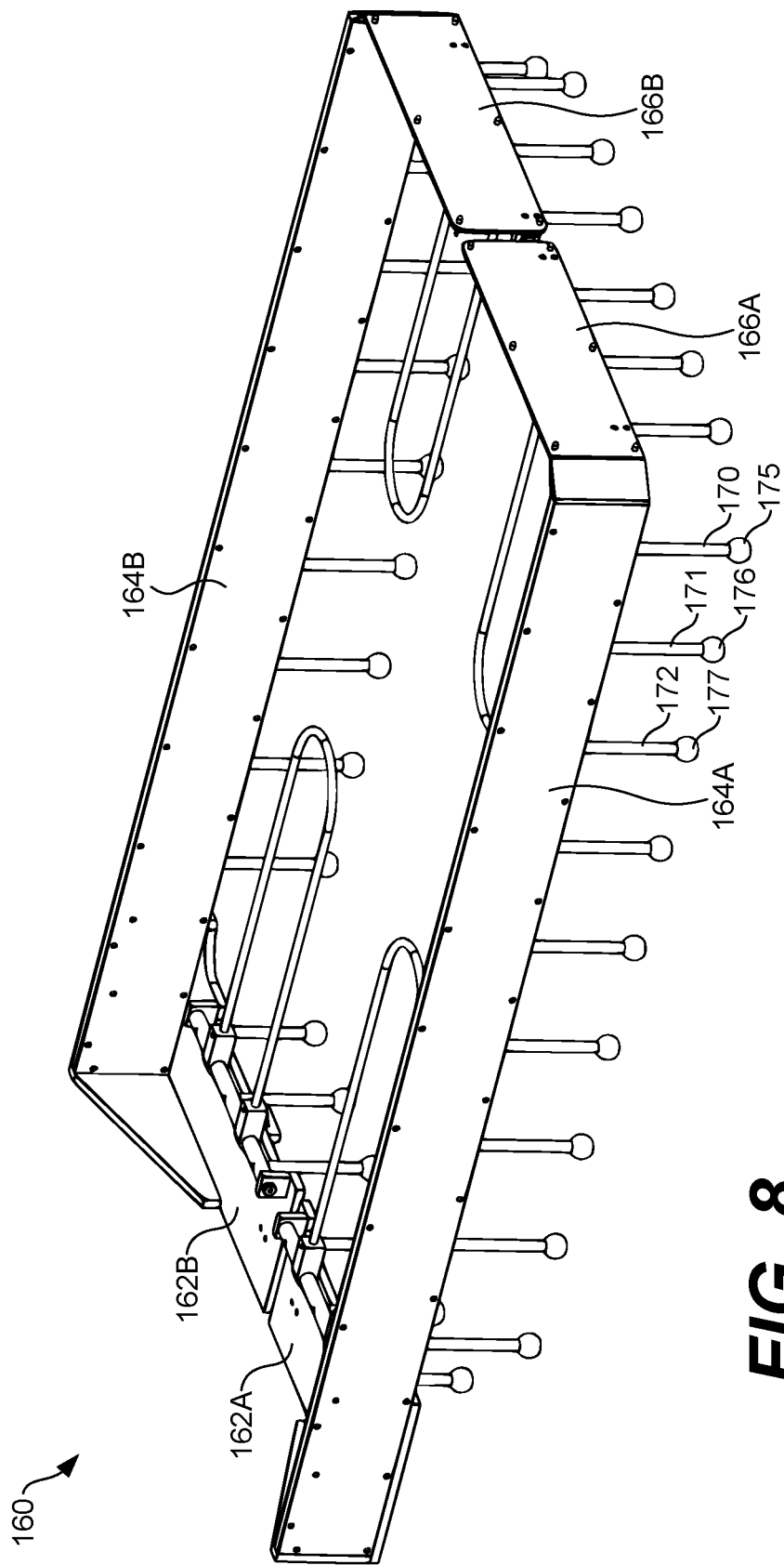
FIG. 8 illustrates an example perimeter bonnet of the pallet jack cap system shown in FIG. 3 according to various aspects of the embodiments.

FIG. 8 illustrates an example perimeter bonnet 160 of the pallet jack cap system 30 shown in FIG. 3 according to various aspects of the embodiments. The perimeter bonnet 160 includes a perimeter frame. The perimeter frame includes a frame base 162A and 162B, frame extension arms 164A and 164B, and a frame end closure 166A and 166B. In the example shown, the frame base 162A, frame extension arm 164A, and frame end closure 166A are separated from (i.e., not mechanically coupled with) the frame base 162B, frame extension arm 164B, and frame end closure 166B. In other examples, such as in FIG. 10, the perimeter bonnet 160 can be a unitary assembly.

The perimeter bonnet 160 also includes one or more pivoting frame catch assemblies, which are described in additional detail below with reference to FIG. 9. A number of catch fingers 170-172 extend from pivoting rods of the pivoting frame catch assemblies, and the catch fingers 170-172 include roller-ball caps 175-177. As shown in FIG. 9, the perimeter bonnet 160 includes catch fingers with roller-ball caps around the entire periphery of the perimeter bonnet 160. However, in other examples, the catch fingers can be omitted from certain sides or locations. The catch fingers 170-172 help to secure items of the unit load 1, particularly lose items at the top of the unit load 1.

The roller-ball caps 175-177 can rotate or spin at the ends of the catch fingers 170-172. As mentioned above with reference to FIG. 2B, the roller-ball caps 175-177 facilitate the removal of wrapping 12, such as plastic wrapping, that may be used to secure the unit load 1 together, even when the perimeter bonnet 160 is in the lowered position over the unit load 1. In some cases, the roller-ball caps 175-177 can be omitted, the catch fingers 170-172 can be omitted, or both the catch fingers 170-172 and the roller-ball caps 175-177 can be omitted.

Figure 9:
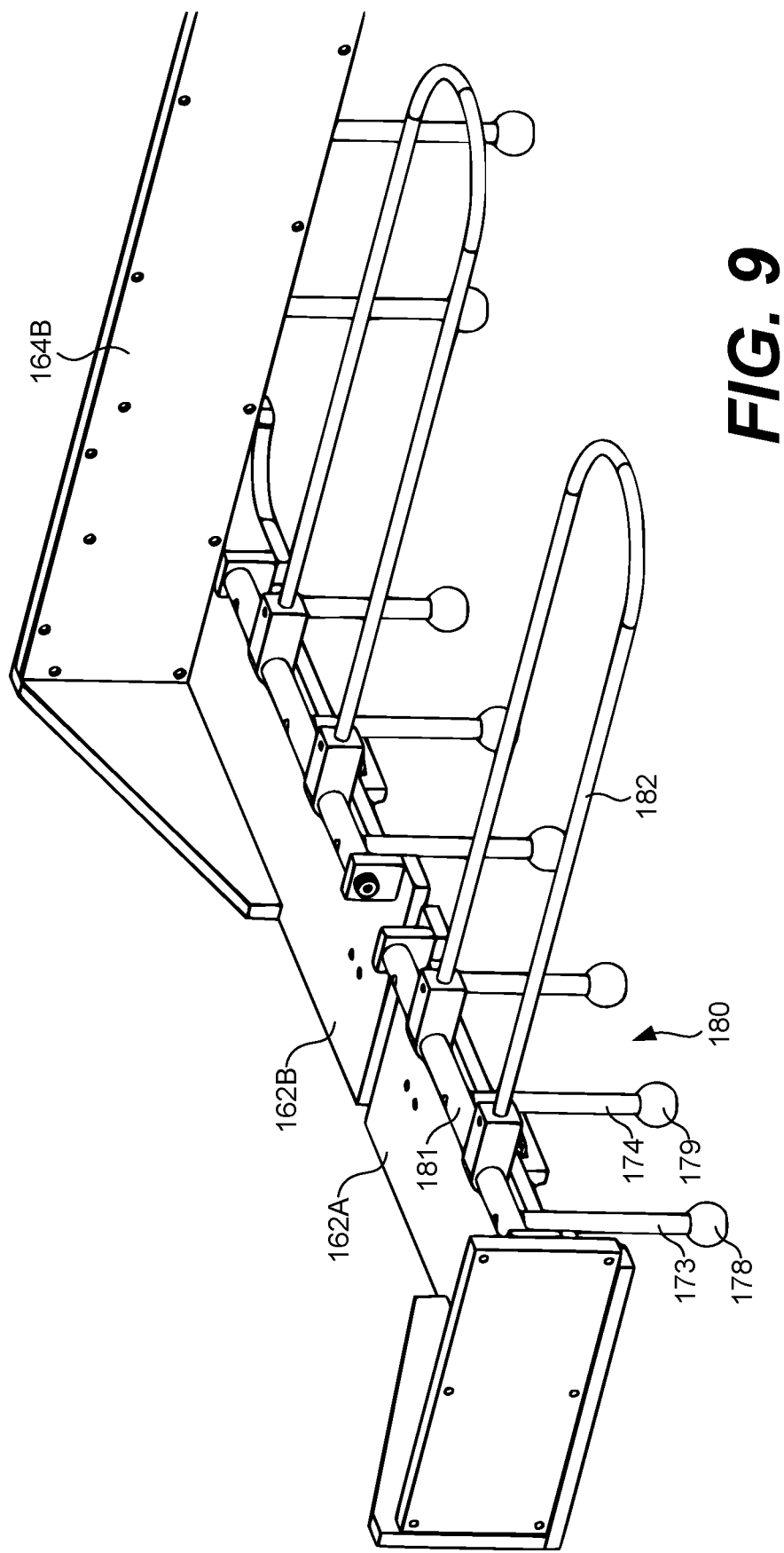
FIG. 9 illustrates a partial exploded view of the example perimeter bonnet of the pallet jack cap system shown in FIG. 8 according to various aspects of the embodiments.

FIG. 9 illustrates a partial exploded view of the perimeter bonnet 160 according to various aspects of the embodiments. In FIG. 9, some of the perimeter bonnet 160 is removed from view, so as to show the pivoting frame catch assembly 180, among others. The pivoting frame catch assembly 180 includes a pivoting rod 181, a number of catch fingers 173 and 174, among others, extending from the pivoting rod 181 in a first direction, and a contact arm 182 extending from the pivoting rod 181 in a second direction. In the example shown, the first direction is orthogonal to, or about 90 degrees offset from, the second direction, although other offsets or directions can be relied upon. The catch fingers 173 and 174 include roller-ball caps 178 and 179.

The pivoting frame catch assembly 180 can pivot about the pivoting rod 181. Although the contact arm 182 is shown to extend horizontally in FIG. 9, the weight of the contact arm 182 is greater than that of the catch fingers 173 and 174. Thus, the pivoting frame catch assembly 180 pivots such that the contact arm 182 extends down at an angle based on the weight of the contact arm 182. Additionally, the catch fingers 173 and 174 pivot and extend outwardly. When the perimeter bonnet 160 is lowered down over the unit load 1, and the contact arm 182 contacts one or more items at the top of the unit load 1, the contact arm 182 will pivot up and the catch fingers 173 and 174 will pivot inward, wrapping or gripping around the top of the unit load 1. In this way, the pivoting frame catch assembly 180 helps to secure items at the top of the unit load 1.

Figure 10:
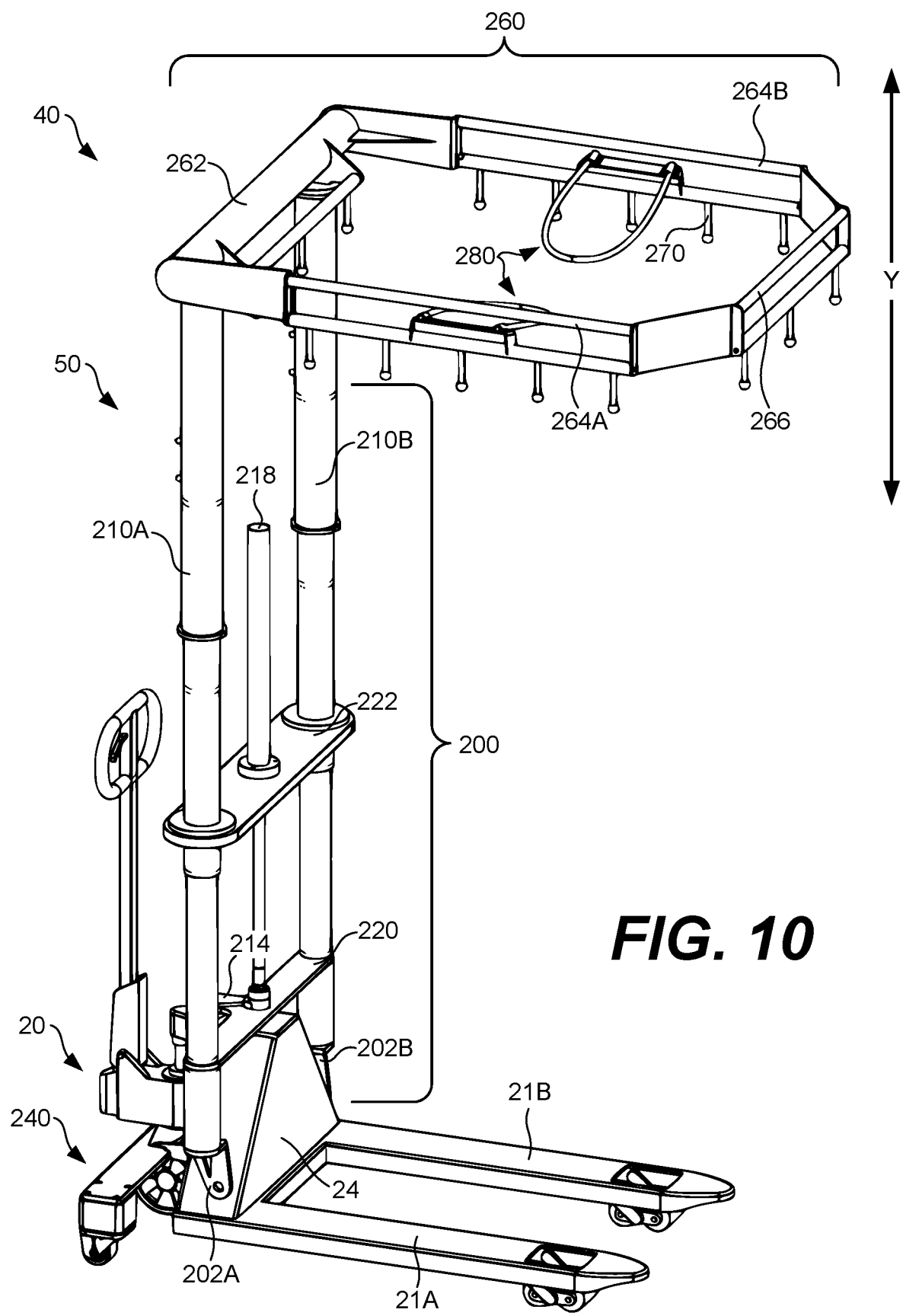
FIG. 10 illustrates another example materials transport system with a different pallet jack cap system according to various aspects of the embodiments.

FIG. 10 illustrates another example materials transport system 40 with a different pallet jack cap system 50 according to various aspects of the embodiments. The pallet jack cap system 50 is illustrated as a representative example in FIG. 10, and it varies as compared to the pallet jack cap system 30 shown in FIG. 3. Other variations on the pallet jack cap systems 30 and 50 are within the scope of the embodiments. One or more of the components shown in FIG. 10 can be omitted or replaced with other components in some examples. In other cases, the pallet jack cap system 50 can include additional parts or components that are not illustrated in FIG. 10. The pallet jack cap system 50 can be formed from any suitable material or materials, including steel, aluminum, other metals, wood, plastic, rubber, or other materials and combinations thereof having sufficient strength and desirable properties. The pallet jack cap system 50 is not limited to being formed from any particular materials among the embodiments.

Among other components, the pallet jack cap system 50 includes a vertical extension system 200 (also "extension system 200"), a stabilization outrigger 240, and a perimeter bonnet 260. The stabilization outrigger 240 is secured around the steer wheels of the pallet jack 20. The stabilization outrigger 240 provides additional stability to the pallet jack 20, to help prevent the pallet jack 20 from tipping or turning over, particularly due to the additional weight and leverage provided by the perimeter bonnet 260.

The extension system 200 includes anchor brackets 202A and 202B, an elevating vertical support assembly having telescoping supports 210A and 210B, a lower frame support 220, and upper frame support 222, an extension lock 214, and an elastic counterpoise 218 secured between the lower frame support 220 and the upper frame support 222. The perimeter bonnet 260 is secured to the telescoping supports 210A and 210B in a cantilevered arrangement, as shown in FIG. 10.

The anchor brackets 202A and 202B are attached or secured to the A-frame 24 of the pallet jack 20 using one or more bolts, mechanical interferences, welds, or other suitable means. The telescoping supports 210A and 210B are mechanically coupled to and extend vertically from the anchor brackets 202A and 202B, respectively. The lower frame support 220 can also be secured to the A-frame 24 using one or more bolts, mechanical interferences, welds, or other suitable means in some cases.

The elastic counterpoise 218 is arranged to assist with positioning the perimeter bonnet 260 to or at a particular elevation based on an extension of the extension system 200, in counterbalance against a weight of the perimeter bonnet 260. In one example, the elastic counterpoise 218 can be embodied as a gas spring. The elastic counterpoise 218 can use compressed gas contained within an enclosed cylinder, which is sealed by a sliding piston, to pneumatically store potential energy. The elastic counterpoise 218 can also release the potential energy to assist with repositioning the perimeter bonnet 260.

Particularly, the telescoping supports 210A and 210B can extend up or retract down, in a nested arrangement of tubing. During extension of the telescoping supports 210A and 210B up in the "Y" direction, the elastic counterpoise 218 can provide a force (i.e., applied between the lower frame support 220 and the upper frame supports 222) that assists with elevating the perimeter bonnet 260 with only the nominal addition of an upward force provided by an operator of the pallet jack cap system 50. During retraction of the telescoping supports 210A and 210B in the "Y" direction, the elastic counterpoise 218 can store potential energy, as the nested arrangement of tubing is collapsed within itself, with only the nominal addition of a downward force provided by an operator of the pallet jack cap system 50. Once the perimeter bonnet 260 is extended or retracted to a desired position, the extension lock 214 can be relied upon to secure the extension system 200 in place. The extension lock 214 can be embodied as a handle or lever, for example, to lock the elastic counterpoise 218 in place at a particular length.

The perimeter bonnet 260 includes a perimeter frame. The perimeter frame includes a cantilevered frame base 262, frame extension arms 264A and 264B, and a frame end closure 266. The frame of the perimeter bonnet 260 can be formed from any suitable materials, including steel, aluminum, other metals, wood, plastic, rubber, or other materials and combinations thereof having sufficient strength and desirable properties. The materials used for the perimeter bonnet 160 may be selected with an emphasis on less weight.

The perimeter bonnet 260 also includes one or more pivoting frame catch assemblies 280, which are similar in structure and function as compared to the pivoting frame catch assemblies 180 illustrated in FIG. 9. A number of catch fingers 270 extend from pivoting rods of the pivoting frame catch assemblies 280. As compared to the perimeter bonnet 160 described above and illustrated in FIG. 8, the perimeter bonnet 260 is not adjustable in width, and cannot be repositioned in a direction other than the "Y" direction shown in FIG. 10.

Figure 11:
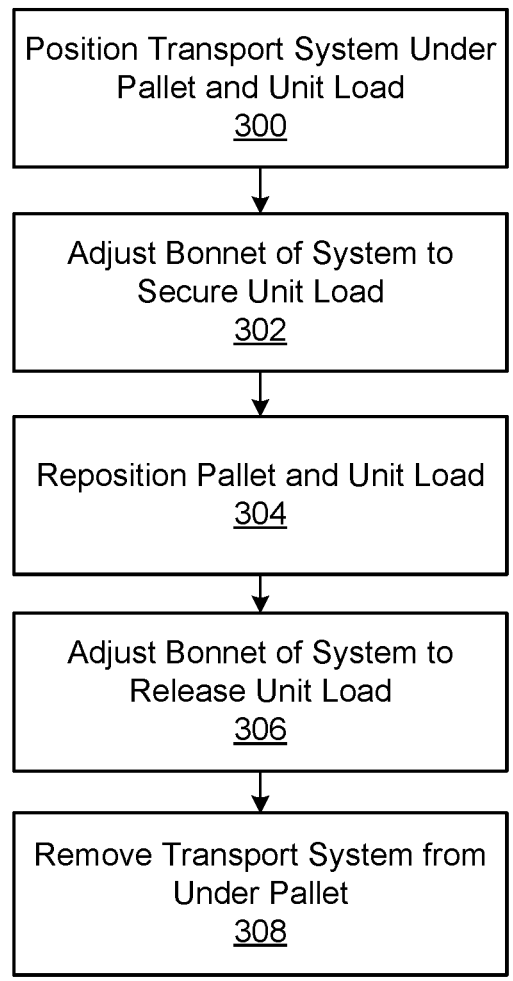
FIG. 11 illustrates an example method of securing and repositioning a unit load using a materials transport system according to various aspects of the embodiments.

FIG. 11 illustrates an example method of transport using a materials transport system according to various aspects of the embodiments. The process shown in FIG. 11 is described in connection with the pallet jack 20, the pallet jack cap system 30, and the pallet jack cap system 50, although related pallet jack cap systems can be relied upon. Although the process diagram shows a certain order of operation, the order can differ from that which is shown. For example, the order of two or more steps can be switched relative to the order shown or as described below. Also, two or more steps shown in succession can be executed concurrently or with partial concurrence. Further, in some examples, one or more of the steps can be skipped or omitted, and the process can continue on with additional steps for any period of time.

At step 300, the process can include an operator positioning a materials transport system under a pallet and unit load, so that it can be lifted and moved. Here, an operator of the materials transport system 10 or an operator of the materials transport system 40 can position it around and over the unit load 1. For example, the materials transport system 10 shown in FIG. 1 can be positioned with the unit load 1 shown in FIG. 2B, particularly with the perimeter bonnet 160 of the materials transport system 10 positioned over the unit load 1. Alternatively, the materials transport system 40 shown in FIG. 10 can be positioned with the unit load 1, particularly with the perimeter bonnet 260 of the materials transport system 40 positioned over the unit load 1. The perimeter bonnets 160 and 260 can be assumed to be at an elevated or extended position, over the unit load 1, at this step.

At step 302, the process can include an operator adjusting the perimeter bonnet 160 of the materials transport system 10. Here, an operator can lower the perimeter bonnet 160 down over the unit load 1, by releasing the brake 119 by the brake lever 117 and pushing down on the handle 116. This will push the inner rails 112A and 112B down between the outer rails 110A and 110B. During retraction of the inner rails 112A and 112B down between the outer rails 110A and 110B, the elastic counterpoise 118 can store potential energy, as the inner rails 112A and 112B slide down between the outer rails 110A and 110B. The perimeter bonnet 160 can be lowered down over the unit load 1 at step 302, to secure the unit load 1 for transport. The perimeter bonnet 260 of the materials transport system 40 can be adjusted in a similar way.

In some cases, step 302 can also include adjusting the size of the perimeter bonnet 160. In one example, this can be achieved through rotation of the wheel 123 in either clockwise or counter-clockwise directions, which adjusts the size of the perimeter bonnet 160 by moving the frame base 162A and 162B, frame extension arms 164A and 164B, and frame end closures 166A and 166B in the Xa and Xb directions, as described above. This permits the operator to adjust the perimeter bonnet 160 to accommodate different widths of the unit load 1.

At step 304, the process can include the operator of the materials transport system 10 or materials transport system 40 repositioning the unit load 1. The operator can lift the unit load 1 using the pallet jack 20 and then reposition the unit load 1 using the pallet jack 20. The unit load 1 can be moved to any suitable location. The unit load 1 should be more stable due to the perimeter bonnet 160 or the perimeter bonnet 260, which is relied upon to secure the top of the unit load 1.

At step 306, the process can include an operator adjusting the perimeter bonnet 160 of the materials transport system 10. Here, an operator can raise the perimeter bonnet 160 up over the unit load 1, by releasing the brake 119 by the brake lever 117 and pushing up on the handle 116. This will extend the inner rails 112A and 112B up between the outer rails 110A and 110B. During extension of the inner rails 112A and 112B down between the outer rails 110A and 110B, the elastic counterpoise 118 can provide potential energy to help extend the inner rails 112A and 112B. The perimeter bonnet 260 of the materials transport system 40 can be adjusted in a similar way.

At step 308, the process can include an operator removing a materials transport system out from under the pallet and unit load 1. Here, an operator of the materials transport system 10 or an operator of the materials transport system 40 can reposition it away from the unit load 1.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A materials transport system, comprising:
   a pallet jack comprising forks with load wheels, a steering handle, steer wheels, and an A-frame; and
   a pallet jack cap system comprising:
      a stabilization outrigger secured around the steer wheels of the pallet jack, the stabilization outrigger comprising a stabilization truss and stabilization wheels secured at opposite ends of the stabilization truss;
      a perimeter bonnet in an elevated position over the forks of the pallet jack for securing items in transport by the pallet jack;
      a vertical extension system secured between the pallet jack and the perimeter bonnet and supporting the perimeter bonnet in the elevated position over the forks of the pallet jack, the vertical extension system comprising:
         an anchor base configured for attachment to the A-frame of the pallet jack;
         an elevating vertical support assembly extending from the anchor base, the perimeter bonnet being secured in a cantilevered arrangement at one end of the elevating vertical support assembly;
         an elastic counterpoise arranged to assist with positioning the perimeter bonnet at a particular elevation based on an extension of the elevating vertical support assembly in counterbalance against a weight of the perimeter bonnet; and
         an extension lock to secure the elevating vertical support assembly at the particular elevation.

2. The materials transport system according to claim 1, wherein the perimeter bonnet comprises:
   a perimeter frame comprising a cantilevered frame base, frame extension arms, and a frame end closure; and
   a pivoting frame catch assembly, the pivoting frame catch assembly comprising a pivoting rod, a number of catch fingers extending from the pivoting rod in a first direction, and a contact arm extending from the pivoting rod in a second direction.

3. The materials transport system according to claim 2, wherein the vertical extension system further comprises a bonnet header, the bonnet header comprising:

a track brace secured at the one end of the elevating vertical support assembly; and a slide rail supported on the track brace with the cantilevered frame base of the perimeter bonnet being slidably secured in a cantilevered position along the slide rail.

4. The materials transport system according to claim 3, wherein the bonnet header of the vertical extension system further comprises:

a rack gear secured to the cantilevered frame base of the perimeter bonnet;

a pinion gear in mechanical engagement with the rack gear; and a bonnet adjustment mechanism to rotate the pinion gear and shift the rack gear for adjustment of a position of the cantilevered frame base of the perimeter bonnet.

5. A cap system, comprising:

a perimeter bonnet for securing items in transport;

an anchor base;

an elevating vertical support assembly extending from the anchor base, the perimeter bonnet being secured in a cantilevered arrangement at one end of the elevating vertical support assembly; and an elastic counterpoise arranged to assist with positioning the perimeter bonnet at a particular elevation based on an extension of the elevating vertical support assembly.

6. The cap system according to claim 5, wherein the anchor base is configured for attachment to an A-frame of a pallet jack.

7. The cap system according to claim 5, further comprising a stabilization outrigger to be secured around steer wheels of a pallet jack, the stabilization outrigger comprising a stabilization truss and stabilization wheels secured at opposite ends of the stabilization truss.

8. The cap system according to claim 5, further comprising an extension lock to secure the elevating vertical support assembly at the particular elevation.

9. The cap system according to claim 8, further comprising:

a handle and a brake lever mounted on the handle, wherein:

the brake lever actuates the extension lock to secure the elevating vertical support assembly at the particular elevation or to release the elevating vertical support assembly from the particular elevation.

10. The cap system according to claim 5, wherein the perimeter bonnet comprises a perimeter frame comprising a cantilevered frame base, frame extension arms, and a frame end closure.

11. The cap system according to claim 5, wherein the perimeter bonnet comprises a pivoting frame catch assembly, the pivoting frame catch assembly comprising a pivoting rod, a number of catch fingers extending from the pivoting rod in a first direction, and a contact arm extending from the pivoting rod in a second direction.

12. The cap system according to claim 10, further comprising a bonnet header, the bonnet header comprising:

a track brace secured at the one end of the elevating vertical support assembly; and a slide rail supported on the track brace with the cantilevered frame base of the perimeter bonnet being slidably secured in a cantilevered position along the slide rail.

13. The cap system according to claim 12, wherein the bonnet header further comprises:

a rack gear secured to the cantilevered frame base of the perimeter bonnet;

a pinion gear in mechanical engagement with the rack gear; and a bonnet adjustment mechanism to rotate the pinion gear and shift the rack gear for adjustment of a position of the cantilevered frame base of the perimeter bonnet.

14. The cap system according to claim 13, wherein the bonnet adjustment mechanism rotates the pinion gear and shifts the rack gear for adjustment of a width of the cantilevered frame base of the perimeter bonnet.

15. The cap system according to claim 5, wherein the elevating vertical support assembly comprises extendable rails.

16. The cap system according to claim 5, wherein the elevating vertical support assembly comprises telescoping supports.

17. A method of securing a unit load using a cap system, comprising:

positioning a materials transport system under a pallet and unit load; and adjusting the materials transport system to secure the unit load, wherein the materials transport system comprises:

a pallet jack; and a pallet jack cap system secured to the pallet jack, the pallet jack cap system comprising:

a perimeter bonnet for securing the unit load;

an elevating vertical support assembly, the perimeter bonnet being secured in a cantilevered arrangement at one end of the elevating vertical support assembly; and an elastic counterpoise arranged to assist with positioning the perimeter bonnet at a particular elevation based on an extension of the elevating vertical support assembly.

18. The method of securing a unit load according to claim 17, wherein adjusting the materials transport system comprises lowering the perimeter bonnet over the unit load to secure the unit load.

19. The method of securing a unit load according to claim 18, further comprising repositioning the unit load using the materials transport system.

20. The method of securing a unit load according to claim 19, further comprising, after the repositioning, raising the perimeter bonnet away from the unit load.

* * * * *